3,738,968
COPOLYAMIDES OF 9,9-BIS(3-AMINOPROPYL)-
FLUORENE
James S. Ridgway, Pensacola, Fla., assignor to Monsanto
Company, St. Louis, Mo.
No Drawing. Continuation-in-part of application Ser. No. 752,498, Aug. 14, 1968. This application Oct. 15, 1970, Ser. No. 81,116
Int. Cl. C08g 20/20
U.S. Cl. 260—78 R  3 Claims

ABSTRACT OF THE DISCLOSURE

High shrinkage polymers useful in production of hosiery and crimpy conjugate yarns are provided by linear copolyamides of at least one aliphatic dicarboxylic acid such as adipic acid, at least one aliphatic diamine such as hexamethylene diamine and 9,9-bis(3'-aminopropyl)fluorene. Even greater shrinkage results when a portion of the aliphatic dicarboxylic acid is replaced with an aromatic dicarboxylic acid such as terephthalic acid.

CROSS-REFERENCE TO RELATED APPLICATION

This application is continuation-in-part of my copending application Ser. No. 752,498 which was filed on Aug. 14, 1968 and is now abandoned.

BACKGROUND OF THE INVENTION

It is well known that various polyamides such as polyhexamethylene adipamide are widely used in the production of textile fibers and molded articles. However, substantial efforts are being continued to develop new polyamides having properties that are even more desirable for such uses. For example, most of the known polyamides have a relatively low boiling water shrinkage. That is, the amount of shrinkage that occurs in fibers made of such polyamides when they are immersed in boiling water is relatively small, e.g. on the order of ten percent or less. In some commercial uses, for example in hosiery, it is desirable that the polyamide fibers have a substantially greater degree of boiling water shrinkage. In the production of crimpy conjugate fibers (i.e. fibers having one or more components) it is likewise very desirable that at least one component has a relatively high shrinkage so that the crimp in the conjugate fiber is substantial and permanent.

Another characteristic that limits the versatility of the most commonly used polyamides is that they are relatively opaque when cast in molded articles of substantial thickness. Accordingly, there is also a current need to develop new polyamides that are better suited for the numerous applications in which transparent plastics are required.

It is therefore an object of this invention to provide novel fiberforming polyamides which have a high degree of boiling water shrinkage. Another object of the invention is to provide novel polyamides which can be molded into transparent articles. Other objects will become apparent from the following detailed description of the invention.

SUMMARY OF THE INVENTION

It has now been discovered that the foregoing objectives can be achieved by a highly polymeric linear copolyamide which is the condensation product of polyamide-forming reactants consisting essentially of at least one aliphatic dicarboxylic acid compound having the formula ROC(CH$_2$)$_m$COR in which $m$ is an integer from 2 to 10 and R is hydroxy, lower (C$_1$–C$_4$) alkoxy, amino or halogen, at least one aliphatic diamine having the formula H$_2$N(CH$_2$)$_n$NH$_2$ in which $n$ is an integer from 2 to 10, and 9,9-bis(3'-aminopropyl)fluorene. The objective of high boiling water shrinkage is even more markedly achieved by a highly polymeric linear copolyamide which is the condensation product of at least one aliphatic dicarboxylic acid compound having the formula ROC(CH$_2$)$_m$COR in which $m$ is an integer from 2 to 10 and R is hydroxy, lower (C$_1$–C$_4$) alkoxy, amino or halogen, at least one aliphatic diamine having the formula (H$_2$N(CH$_2$)$_n$NH$_2$ in which $n$ is an integer from 2 to 10, 9,9-bis(3'-aminopropyl)fluorene and at least one aromatic dicarboxylic acid compound having the formula

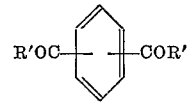

in which R' is hydroxy, lower (C$_1$–C$_4$) alkoxy, amino or halogen.

DETAILED DESCRIPTION OF THE INVENTION

In view of the properties of similar known polyamides, it is quite unexpected that the copolyamides of this invention can be formed into fibers that have both good textile properties and high boiling water shrinkage. Thus, for example, polyhexamethylene adipamide fibers have a boiling water shrinkage of only about ten percent and when twenty percent of the adipic acid in such a homopolymer is replaced with terephthalic acid, the shrinkage of the resulting copolyamide is still only about ten percent, but when a substantial proportion of the diamine in such a homopolyamide or copolyamide is replaced with 9,9-bis(3'-aminopropyl)fluorene in accordance with the present invention, the boiling water shrinkage of the resulting copolymer is much greater and typically at least several times that value (e.g. in the range of 25–55%).

In general, the copolyamides of this invention are prepared by copolymerizing substantially equimolar proportions of the appropriate diamines and dicarboxylic acid compounds. That is, the total moles of the aliphatic diamine and the 9,9-bis(3'-aminopropyl)fluorene in the reaction mixture are the substantial stoichiometric equivalent of the total moles of dicarboxylic acid compound in the mixture. When the polyamide-forming reactants employed include no aromatic dicarboxylic acid compound, the mole percentage of 9,9-bis(3'-aminopropyl)fluorene in the mixture and the resulting copolymer is substantially more than 10 percent but not more than about 90 percent, e.g. from about 15 percent to about 90 percent and in most cases from about 15 percent to about 50 percent, based on the total moles of the 9,9-bis(3'-aminopropyl)fluorene and the aliphatic diamine. On the other hand, when the polyamide-forming reactants employed include at least one aliphatic dicarboxylic acid compound and at least one aromatic dicarboxylic acid compound such as terephthalic acid, the mole percentage of 9,9-bis(3'-aminopropyl)fluorene in the mixture and the resulting copolymer is from about 1 percent to about 90 percent (in most cases from about 10 percent to about 50 percent) based on the total moles of the 9,9-bis(3'-aminopropyl)fluorene and the aliphatic diamine and the mole percentage of the aromatic dicarboxylic acid compound in the mixture and the resulting copolymer is from about 1 percent to about 99 percent (in most cases from about 10 percent to about 50 percent) based on the total moles of the aliphatic dicarboxylic acid compound and the aromatic dicarboxylic acid compound.

U.S. Pat. No. 2,320,029 describes the preparation of 9,9-bis(3'-aminopropyl)fluorene which has the structural formula

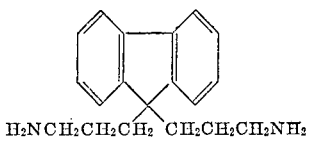

H₂NCH₂CH₂CH₂  CH₂CH₂CH₂NH₂

The aliphatic diamines and dicarboxylic acid compounds which are used to prepare the copolyamides of this invention are also well known in the art. Examples of the aliphatic diamines are ethylene diamine, propylene diamine, tetramethylene diamine, pentamethylene diamine, decamethylene diamine and the like. Suitable aliphatic dicarboxylic acid compounds include succinic, glutaric, adipic, pimelic, suberic, azelaic, sebacic, undecandioic and dedecanedioic acid, the amides and lower alkyl (e.g. methyl, ethyl, propyl or butyl) esters thereof and the corresponding acid halides (e.g. chlorides). Suitable aromatic dicarboxylic acid compounds, in which the R'OC— groups are preferably meta or para to one another, include terephthalic and isophthalic acids, the amides and lower alkyl esters thereof and the corresponding acid halides (e.g. chlorides).

Although the foregoing diamines and dicarboxylic acid compounds may be combined for polymerization as unreacted compounds, the substantially equimolar proportions of the reactants are in many cases desirably added to the reaction mixture as salts previously formed by reacting about one mole of dicarboxylic acid compound with one mole of diamine in a suitable inert solvent (e.g. water, a lower alkanol such as ethanol or a lower alkanol-water mixture). After combination of the diamines and acid compounds or the preparation of such salts, the copolyamides of this invention are prepared by procedures known in the art and commonly employed in the manufacture of polyamides by condensation of bifunctional dicarboxylic acid compounds and bifunctional diamines. Illustrative methods are those described in U.S. Pat. Nos. 2,130,523 and 2,130,948. In accordance with such methods, the reactants or the salts thereof are heated at a temperature of from 180° to 300° C. and preferably from 200° to 295° C. until the product has a sufficiently high molecular weight to exhibit fiber-forming properties, which properties are reached when the copolyamide has an intrinsic viscosity of at least about 0.4. The reaction can be conducted at superatmospheric, atmospheric, or subatmospheric pressure. It is often desirable, especially in the last stage of the reaction, to employ conditions (e.g. reduced pressure) which will aid in the removal of the reaction by-products. Preferably the reaction is carried out in the absence of oxygen, for example, in an atmosphere of nitrogen.

Intrinsic viscosity as employed herein is defined as $$\lim_{C \to 0} \left( \frac{\log_e N_r}{C} \right)$$

in which $N_r$ is the relative viscosity of a dilute solution of the polymer in m-cresol in the same units at the same temperature and C is the concentration in grams of polymer per 100 cc. of the solution.

In order to illustrate the invention and the advantages thereof with greater particularity, the following specific examples are given. It is to be understood that they are intended to be only illustrative and not limitative. Parts are given by weight unless otherwise indicated.

EXAMPLE I

A solution containing 58.16 parts (80 mole percent) of hexamethylenediammonium adipate and 23.76 parts (20 mole percent) of fluorene-9-ylidene bis(propylammonium)adipate (the salt formed by reaction of equipmolar quantities of adipic acid and 9,9-bis(3'-aminopropyl)fluorene dissolved in 50 parts of water was placed in a stainless steel high-pressure autoclave which had been previously purged of oxygen with purified nitrogen. The temperature and pressure within the autoclave were slowly raised until values of 220° C. and 250 p.s.i.g., respectively, were reached. The temperature was then further increased to 243° C. while the pressure was maintained at 250 p.s.i.g. by removal of steam. Thereafter, the pressure within the autoclave was gradually reduced to atmospheric over a 25-minute period. During this period the temperature was allowed to level out at 280° C. at which temperature the polymer melt was allowed to equilibrate for 30 minutes. The resultant random copolymer was substantially completely transparent and melted over a temperature range that averaged 237.5° C. This molten polymer was melt spun directly from the bottom of the autoclave through a single-hole spinneret to yield a mono-filament having good textile properties.

EXAMPLE II

A solution of 48.08 parts (70 mole percent) of hexamethylenediammonium adipate and 32.52 parts (30 mole percent) of fluorene-9-ylidene bis(propylammonium) adipate dissolved in 50 parts of water was placed in a stainless steel high-pressure autoclave. Polymerization of the mixture was brought about by the procedure set forth in Example I. The resulting random copolymer was substantially completely transparent and melted over a temperature range that averaged 216° C. The finished polymer was melt spun directly from the autoclave through a single-hole spinneret to yield a mono-filament yarn having good textile properties.

EXAMPLE III

A solution of 43.04 parts (60 mole percent) of hexamethylenediammonium adipate, 15.44 parts (20 mole percent) of hexamethylenediammonium terephthalate and 23.36 parts (20 mole percent) of fluorene-9-ylidene bis(propylammonium)adipate dissolved in 50 parts of water was placed in a stainless steel high-pressure autoclave. Polymerization of the mixture was brought about by the procedure set forth in Example I. The resulting polymer was substantially completely transparent and melted over a temperature range that averaged 234° C. The finished polymer was melt spun directly from the autoclave through a single-hole spinneret to yield a mono-filament yarn having good textile properties.

Comparative tests were conducted to determine relative boiling water shrinkage in comparison to a conventional polyhexamethylene adipamide (nylon 66) yarn. The yarns were immersed in boiling water for a period of 5 minutes and their lengths were measured before and after the immersion. The percent boiling water shrinkage is determined by the following formula:

$$\frac{\text{length before exposure} - \text{length after exposure}}{\text{length before exposure}} \times 100 = \text{percent boiling water shrinkage}$$

The results obtained in this test are illustrated by the following table:

| Example | Boiling water shrinkage, percent |
|---|---|
| I | 26 |
| II | 55 |
| III | 46 |
| Nylon 66 (control) | 10.3 |

I claim:

1. A linear fiber-forming polymeric condensation product of polyamide-forming reactants consisting essentially of adipic acid, hexamethylene diamine, terephthalic acid and 9,9-bis(3'-aminopropyl)fluorene wherein the mole percentage of the 9,9-bis(3'-aminopropyl)fluorene is from about 1 to about 90 percent, based on the total moles of the hexamethylene diamine and the 9,9-bis(3'-aminopropyl)fluorene and the mole percentage of the terephthalic acid is from about 1 to about 99 percent, based on the total moles of the adipic and terephthalic acids.

2. A copolyamide as defined in claim 1 wherein the mole percentage of the terephthalic acid is from about 10 to about 50 percent, based on the total moles of the adipic and terephthalic acids.

3. A copolyamide as defined in claim 2 wherein the mole percentage of the 9,9-bis(3'-aminopropyl)fluorene is from about 10 to about 50 percent, based on the total moles of the hexamethylene diamine and the 9,9-bis(3'-aminopropyl)fluorene.

References Cited
UNITED STATES PATENTS

| | | | |
|---|---|---|---|
| 3,376,270 | 4/1968 | Ridgway | 260—78 R |
| 3,383,368 | 5/1968 | Ridgway | 260—78 R |
| 3,388,099 | 6/1968 | Ridgway | 260—78 R |
| 3,475,387 | 10/1969 | Carter et al. | 260—78 R |
| 3,505,298 | 4/1970 | Davis et al. | 260—78 R |

HAROLD D. ANDERSON, Primary Examiner

U.S. Cl. X.R.

260—78 S